United States Patent [19]
King

[11] Patent Number: 6,158,761
[45] Date of Patent: Dec. 12, 2000

[54] ACCESSORY MOUNTING APPARATUS FOR A PICKUP TRUCK

[75] Inventor: Robert H. King, Martin, Tenn.

[73] Assignee: Tennessee Truck Works, L.L.C., Dresden, Tenn.

[21] Appl. No.: 09/307,679

[22] Filed: May 10, 1999

[51] Int. Cl.[7] .................................................. B60D 1/52
[52] U.S. Cl. ........................ 280/495; 410/121; 403/338
[58] Field of Search ................................... 403/338, 335, 403/257, 259, 260; 280/495, 491.5, 417.1, 901; 248/346.01, 346.02, 678; 238/151, 186, 272, 312, 315; 211/13.1, 182; 410/121, 151

[56] References Cited

U.S. PATENT DOCUMENTS

| | | | |
|---|---|---|---|
| 1,149,649 | 8/1915 | Hoffman et al. | 238/58 |
| 1,166,997 | 1/1916 | Landreth | 238/314 |
| 1,525,331 | 2/1925 | Snyder | 238/60 |
| 3,336,051 | 8/1967 | Dale | 280/423 |
| 3,390,896 | 7/1968 | Philapy | 280/423 |
| 3,606,152 | 9/1971 | Orth | 238/215 |
| 3,826,516 | 7/1974 | Weber | 280/407 |
| 3,848,713 | 11/1974 | Laurent et al. | 191/32 |
| 3,848,894 | 11/1974 | Breford | 280/437 |
| 3,910,624 | 10/1975 | Becker | 296/35 R |
| 3,952,948 | 4/1976 | Nelson et al. | 238/243 |
| 4,088,339 | 5/1978 | Sagebiel | 280/423 |
| 4,105,160 | 8/1978 | Ramer | 238/167 |
| 4,643,443 | 2/1987 | Husa | 280/491 R |
| 4,869,628 | 9/1989 | Fletcher | 410/100 |
| 4,960,288 | 10/1990 | Chambers | 280/423.1 |
| 5,012,938 | 5/1991 | King | 211/191 |
| 5,016,898 | 5/1991 | Works | 280/433 |
| 5,065,873 | 11/1991 | Tseng | 211/187 |
| 5,421,612 | 6/1995 | Floe | 280/789 |
| 5,427,487 | 6/1995 | Brosfske | 410/121 |
| 5,472,222 | 12/1995 | Marcy | 280/433 |
| 5,513,869 | 5/1996 | Putnam | 280/415.1 |
| 5,513,941 | 5/1996 | Kulas et al. | 414/522 |

FOREIGN PATENT DOCUMENTS 2196408  4/1988  United Kingdom.

*Primary Examiner*—Brian L. Johnson
*Assistant Examiner*—Daniel Yeagley
*Attorney, Agent, or Firm*—Walker, McKenzie & Walker, P.C.

[57] ABSTRACT

A mounting apparatus for mounting an accessory to a pickup truck having a chassis, and having a bed attached to the chassis. The mounting apparatus includes a frame assembly for receiving the accessory; and bed pad structure for attachment to the chassis of the truck and for selectively attaching the frame assembly to the chassis of the truck with a portion of the bed pad structure positioned within the bed of the truck in a position in which the bed pad structure will not encumber the bed of the truck when the frame assembly is not attached to the chassis of the truck.

9 Claims, 8 Drawing Sheets

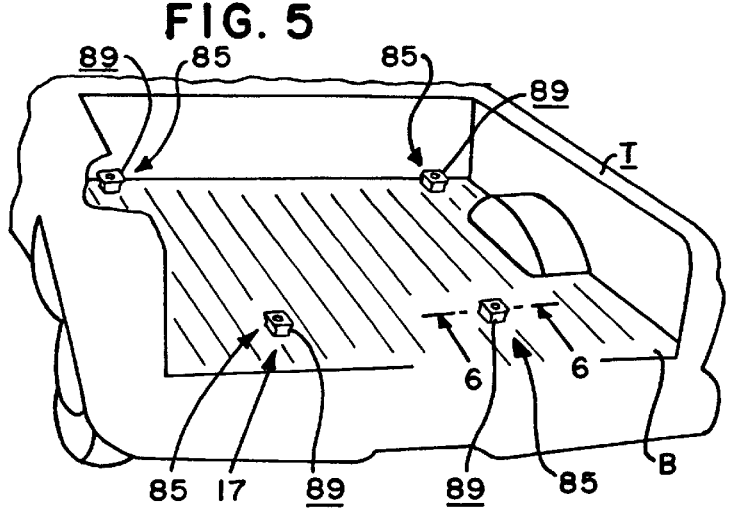
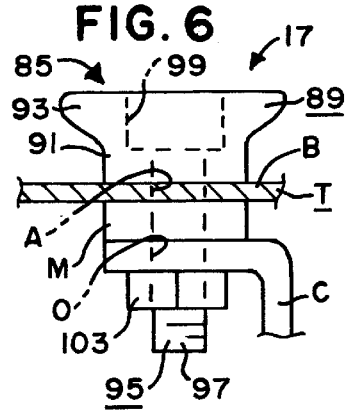
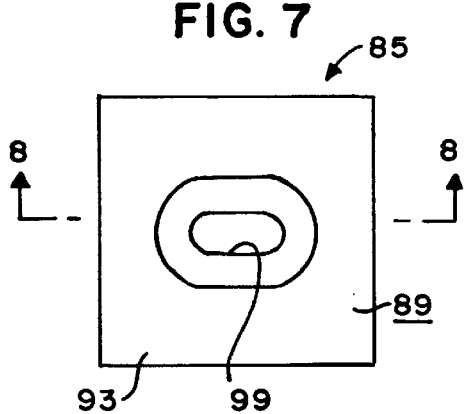
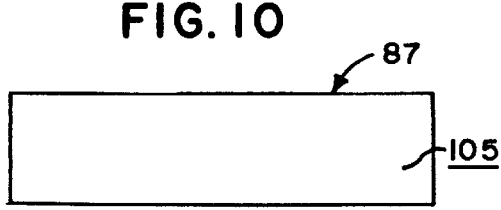
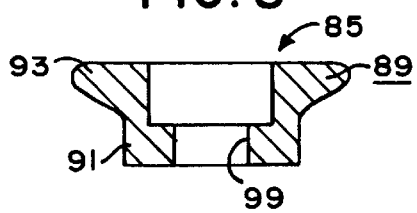
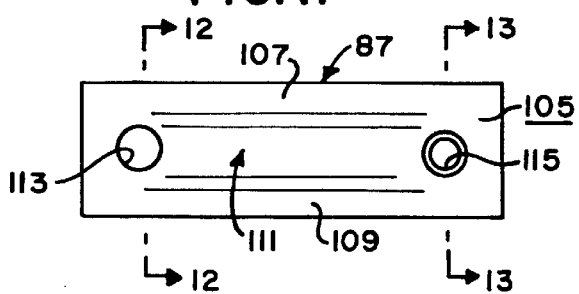
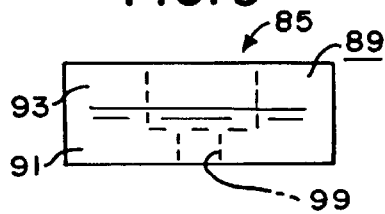
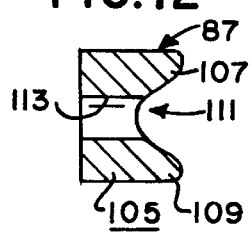
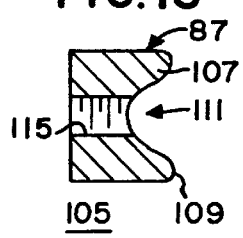

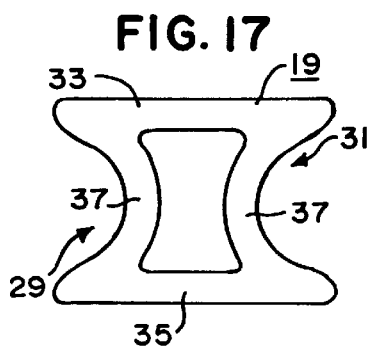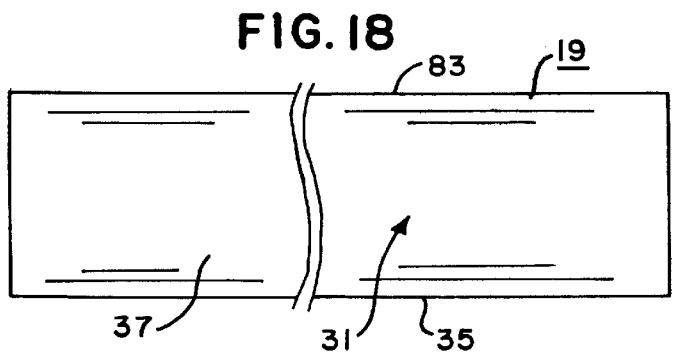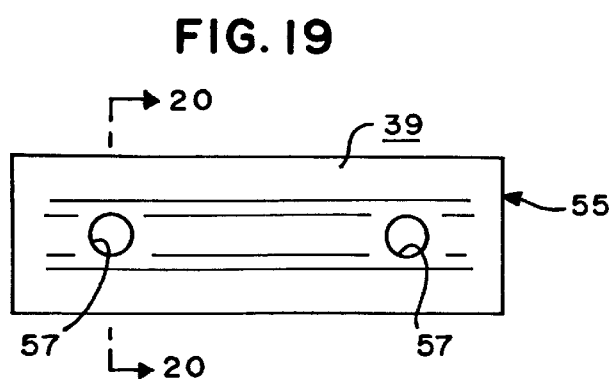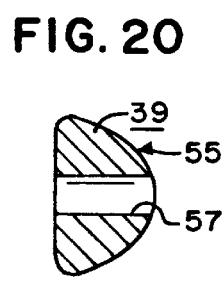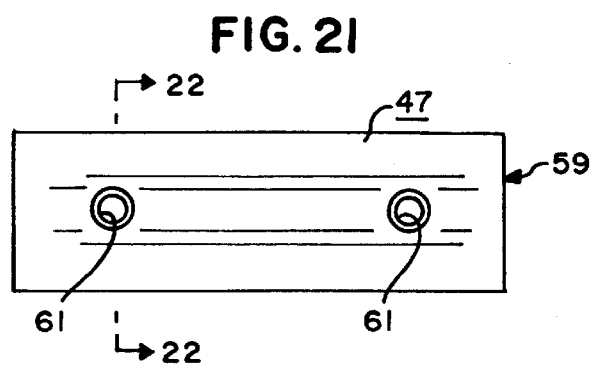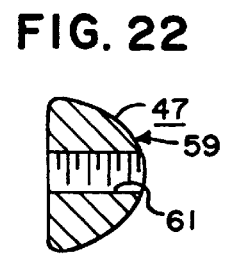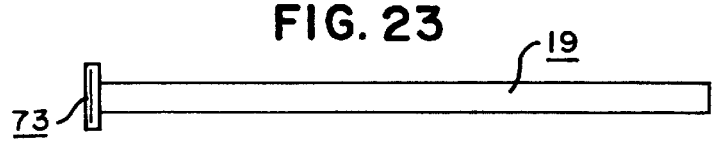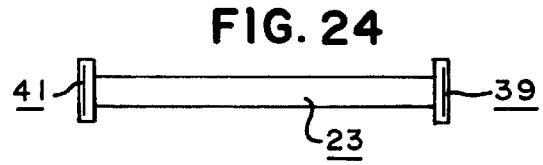

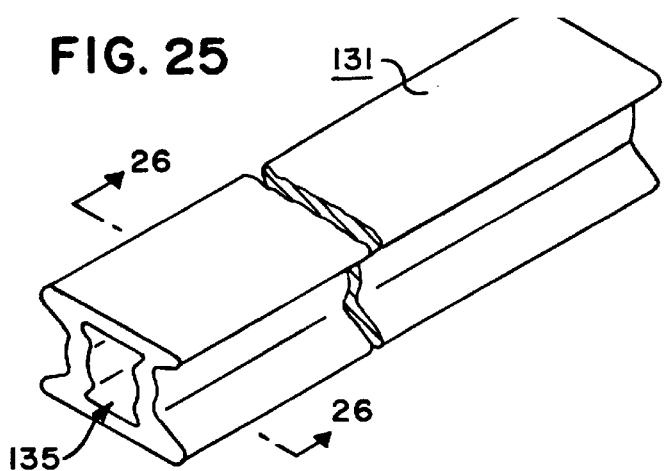
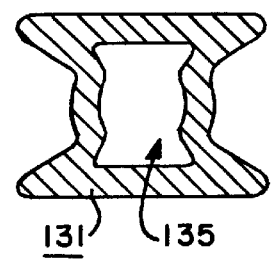
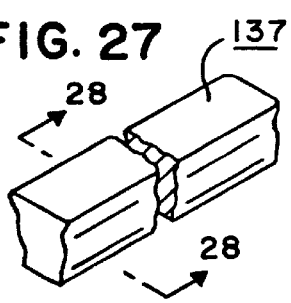
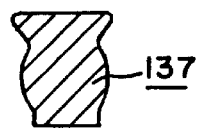
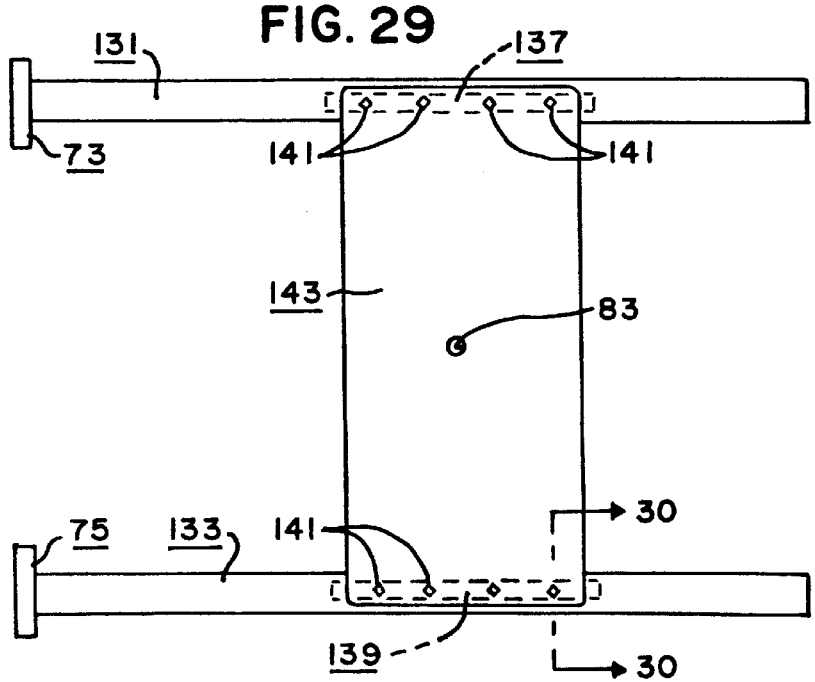
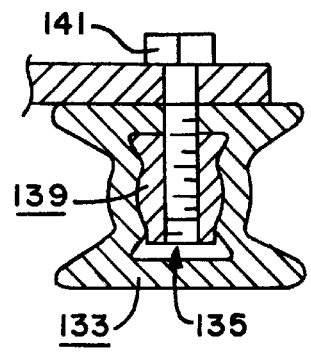

ACCESSORY MOUNTING APPARATUS FOR A PICKUP TRUCK

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to an apparatus that can be installed in the bed of a pickup truck or the like with little or no modification of the bed, and that allows an accessory such as a trailer hitch, to be mounted to the bed of the truck in a manner that will not encumber the bed of the truck when the accessory is not needed.

2. Information Disclosure Statement

A preliminary patentability search conducted in class 280, subclasses 423.1, 433 and 901, produced the following patents which appear to be relevant to the present invention:

Dale, U.S. Pat. No. 3,336,051, issued Aug. 15, 1967, discloses a trailer coupler having crossed and pivoted anchor bars each coupled to a separate part of a two-part hitch column that receives a trailer draw-bar. Bolts pass through slots or apertures formed in the anchor bars and apertures or the like formed in the bed of a truck or other tractor vehicle to thereby secure the anchor bars to the bed of the truck or other tractor vehicle.

Philapy, U.S. Pat. No. 3,390,896, issued Jul. 2, 1968, discloses several trailer hitches for connecting a gooseneck or fifth wheel trailer to a pickup truck or automobile. In one embodiment, the trailer hitch includes a circular base plate adapted to be secured to the vehicle bed by a plurality of bolts which pass through the base plate and corresponding apertures formed in the bottom of the vehicle bed. In another embodiment, the hitch includes a pair of parallel bars adapted to be secured to the vehicle bed by a plurality of bolts which pass through the bars and corresponding apertures formed in the bottom of the vehicle bed. In still another embodiment, the hitch includes a pair of side plates adapted to be secured to the vehicle bed by a plurality of bolts which pass through the bars and corresponding apertures formed in the side walls of the vehicle bed.

Sagebiel, U.S. Pat. No. 4,088,339, issued May 9, 1978, discloses a trailer hitch assembly which may be easily installed and removed from the bed of a pickup truck. The trailer hitch assembly includes a pair of retaining brackets which are mounted inside the individual wheel wells of the truck and are also secured to the truck frame. Each retaining bracket includes a side frame member contoured with curved ends so as to fit the outer surface of a respective wheel well. A frame bracket is secured to the frame of the pickup truck by means of mounting bolts, and has a bracket plate that extends along the inside of a respective wheel well. Locking pins are provided to extend through apertures in each side frame member, through apertures formed in each wheel well, and through apertures in each bracket plate to thereby lock the retaining brackets to the frame of the pickup truck.

Husa, U.S. Pat. No. 4,643,443, issued Feb. 17, 1987, discloses a removable trailer hitch assembly for connecting a gooseneck trailer to a pickup truck. The hitch assembly includes a base frame having a ball hitch mounted thereon and adapted to be positioned in the floor of the pickup truck box or bed so that the frame straddles both wheel wells and positions the ball hitch over the rear axle of the pickup truck. Two pairs of pivotable elongate members are telescopingly attached to the base frame to frictionally engage the lower surface of the upper horizontal side rail caps of the pickup bed. Means such as springs are provided to bias each side pair of side rail engaging members so as to secure the hitch assembly in the pickup bed by making a positive frictional engagement with the box side rails.

Works, U.S. Pat. No. 5,016,898, issued May 21, 1991, discloses a fifth wheel trailer hitch assembly for pickup trucks and flat bed vehicles which includes a hitch ball selectively positioned with a retention sleeve mounted below and through the cargo bed of the truck or flat bed vehicle. A hole, large enough for the hitch ball to extend therethrough, is formed in the cargo bed. A locking pin is provided to secure the hitch ball either in a first upright position within the sleeve wherein the ball is elevated with respect to the cargo bed, or in an inverted position wherein the base of the hitch ball is mounted flush with the cargo bed.

Marcy, U.S. Pat. No. 5,472,222, issued Dec. 5, 1995, discloses a hitch for a goose neck trailer. The hitch includes a cross member positionable beneath the cargo bed and between the frame members of a truck. A central opening is provided on the cross member for removably receiving a ball hitch. A hole is drilled through the cargo bed of the truck corresponding to the central opening in the cross member. The ball hitch extends through the hole drilled through the cargo bed and protrudes above the cargo bed.

Putnam, U.S. Pat. No. 5,513,869, issued May 7, 1996, discloses a fifth wheel hitch assembly which is mounted on the hitch ball of a gooseneck subassembly. The subassembly is mounted in the bed of a pickup truck by forming a series of holes through the bed of the pickup truck adjacent each rear wheel well thereof and the passing carriage bolts from underneath the bed through the holes thus formed and into opposite ends of the subassembly such that the subassembly is parallel to the rear axle of the truck and the hitch ball is substantially centered over the axle differential housing.

Various accessories are commonly mounted to pickup trucks and the like for enhancing the utility, etc., of the trucks. Such accessories include bed level tie down points for bed level lashing, either fixed or adjustable to meet load requirements; tie down points at the front or along the sides of the bed for vertical lashing, either fixed or adjustable to meet load requirements; tier racks to support and separate fragile loads, either fixed or adjustable; drop on static ramps for loading lawn mowers, 4 wheelers, etc., by driving on, or using an in-bed winch to pull items into the truck bed; powered ramps; slider ramps to allow boats and the like to be launched from and loaded into the truck bed; winch mounts for large winch jobs from the rear of the truck, complete with cable guides for correct cable pull and truck protection; tailgate lifts to access loads form the ground into the truck; motorized and hand crank crane lifts to lift loads by a cable and then swing or roll the load into the truck bed; gooseneck hitches; fifth wheel hitches; combination hitches providing foundations for both fifth wheel and gooseneck hitches; air foil mounts; load positioners for variety of loads, e.g., tool boxes, liquid tanks, dog boxes, palletized loads; bed protection liners; bed protection dump liners; utility rack mounting for ladder racks, glass racks, campers, etc., rolling bed mounts; etc. One major disadvantage with all such accessories is that they are typically mounted to the pickup truck in such a manner so as to permanently encumber the bed of the pickup truck, etc.

Common gooseneck and fifth-wheel type trailers are typically coupled to a tow vehicle with the trailer hitch positioned substantially over the axis of the rear wheels of the tow vehicle to place the draw-bar load of the front end of the trailer on the springs and load-supporting rear axle and wheels of the tow vehicle. It is believed that the most common gooseneck or fifth-wheel type trailer hitch mechanism used in combination with a typical pickup truck is similar to that disclosed in Dale, U.S. Pat. No. 3,336,051. In order to properly and securely mount such a gooseneck or fifth-wheel type trailer hitch mechanism to a typical pickup truck, the bed of the pickup truck is normally completely removed from the chassis to fully expose the chassis frame adjacent the rear axle of the pickup truck, the hitch mechanism can then be welded or otherwise securely attached to the chassis frame adjacent the rear axle of the pickup truck, and a large hole can be cut or otherwise formed through the bed of the pickup truck to allow the upper end of the hitch mechanism to extend therethrough. The bed of the pickup truck can then be reattached to the chassis with the upper end of the hitch mechanism extending through the hole cut or otherwise formed through the bed. Such installations are troublesome and considered by many to be unsightly. They interfere with the normal use of the truck when not towing a trailer, and, furthermore, degrade the resale value of the truck. It is pertinent to note that many owners of these types of trucks take a lot of pride in the appearance of their trucks and will not allow anything done to them which mars that appearance. That applies even though the ability to tow gooseneck and fifth-wheel trailers would be a substantial advantage. Some owners even purchase two trucks, one modified for towing and one kept in its unmodified condition.

Nothing in the known prior art discloses or suggests the present invention. More specifically, nothing in the known prior art discloses or suggests a mounting apparatus including a frame assembly for receiving an accessory; and bed pad means for attachment to the chassis of a truck and for selectively attaching the frame assembly to the chassis of the truck with a portion of the bed pad means positioned within the bed of the truck in a position in which the bed pad means will not encumber the bed of the truck when the frame assembly is not attached to the chassis of the truck.

BRIEF SUMMARY OF THE INVENTION

The present invention provides a mounting apparatus for connecting trailers to small to medium size trucks. More specifically, the mounting apparatus of the present invention allows gooseneck or fifth-wheel type trailers (i.e., trailers that are not connected to a tow vehicle by bumper-mounted hitches) to be connected to standard pickup trucks. A basic concept of the present invention is to provide such a mounting apparatus that can be installed in the bed of standard pickup trucks with little or no modification to the bed.

The mounting apparatus of the present invention comprises, in general, a frame assembly having a support member for receiving an accessory; and bed pad means for attachment to the chassis of a truck and for selectively attaching the frame assembly to the chassis of the truck with a portion of the bed pad means positioned within the bed of the truck in a position in which the bed pad means will not encumber the bed of the truck when the frame assembly is not attached to the chassis of the truck.

One object of the present invention is to provide a mounting apparatus which allows truck-bed positioned balls or fifth-wheels (i.e., not bumper-mounted hitches) to be installed in the bed of a pick-up truck or the like with little or no modification to the bed.

Another object of the present invention is to provide such a mounting apparatus that can be quickly and easily mounted and dismounted from the truck-bed without modifying or marring the appearance of the truck.

Another object of the present invention is to provide a mounting apparatus whereby a number of additional pieces of equipment in addition to a gooseneck hitch or a ball hitch may be removably mounted to the frame, via quick-connection means so as to allow such equipment to be easily and quickly installed or removed, again without damage or encumbrance to the truck bed.

BRIEF DESCRIPTION OF THE SEVERAL VIEWS OF THE DRAWINGS

FIG. 1 is a perspective view of a first embodiment of the mounting apparatus of the present invention, shown installed in the bed of a pickup truck or the like.

FIG. 5 is a perspective view similar to FIG. 1, but with a portion of the mounting apparatus thereof removed, leaving the bed of the pickup truck unencumbered.

FIG. 6 is a sectional view substantially as taken on line 6—6 of FIG. 5, on a somewhat enlarged scale and with portions omitted for clarity.

FIG. 7 is a top plan view of a bed pad of the mounting apparatus of FIG. 1.

FIG. 8 is a sectional view as taken on line 8—8 of FIG. 7.

FIG. 9 is a side elevational view of the bed pad of FIG. 7.

FIG. 10 is a top plan view of a clamp rail of the mounting apparatus of FIG. 1.

FIG. 11 is a front elevational view of the clamp rail of FIG. 10.

FIG. 12 is a sectional view as taken on line 12—12 of FIG. 11.

FIG. 13 is a sectional view as taken on line 13—13 of FIG. 11.

FIG. 17 is an end elevational view of a main rail of the frame assembly of FIG. 14.

FIG. 18 is a top plan view of the main rail of FIG. 17, with portions thereof broken away for clarity.

FIG. 19 is a front elevational view of a first clamp bar of the frame assembly of FIG. 14.

FIG. 20 is a sectional view substantially as taken on line 20—20 of FIG. 19.

FIG. 21 is a front elevational view of a second clamp bar of the frame assembly of FIG. 14.

FIG. 22 is a sectional view substantially as taken on line 22—22 of FIG. 21.

FIG. 23 is a top plan view of a first main rail and clamp bar construct of the frame assembly of FIG. 14.

FIG. 24 is a top plan view of a second main rail and clamp bar construct of the frame assembly of FIG. 14.

FIG. 25 is a perspective view of a modified construction of a main rail of the mounting apparatus of FIG. 1.

FIG. 26 is a sectional view substantially as taken on line 26—26 of FIG. 25, on a somewhat enlarged scale.

FIG. 27 is a perspective view of a modified construction of a clamp bar for use with the main rail of FIG. 25.

FIG. 28 is a sectional view substantially as taken on line 28—28 of FIG. 27, on a somewhat enlarged scale.

FIG. 29 is a top plan view of a frame assembly of the mounting apparatus of FIG. 1, formed using main rails as shown in FIG. 25 and using clamp bars as shown in FIG. 27.

FIG. 30 is a sectional view substantially as taken on line 30—30 of FIG. 29, on a somewhat enlarged scale and with portions omitted for clarity.

FIG. 31 is a perspective view of a second embodiment of the mounting apparatus of the present invention, shown installed in the bed of a pickup truck or the like.

DETAILED DESCRIPTION OF THE INVENTION

Figure 1:
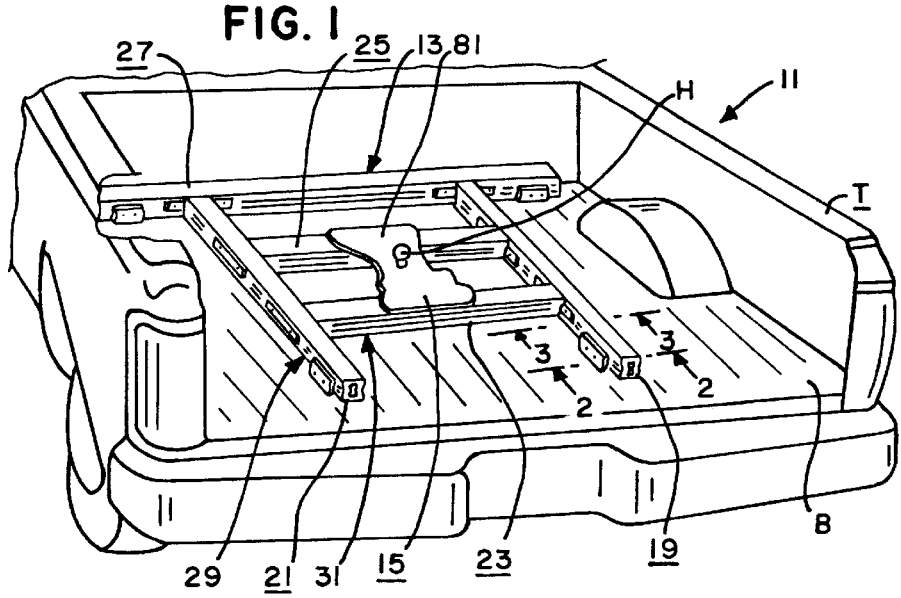

A first preferred embodiment of the mounting apparatus of the present invention is shown in FIGS. 1–30, and identified by the numeral 11. The mounting apparatus 11 is especially adapted and designed to be installed in the bed B of a pickup truck T (see FIGS. 1, 2 and 5) or the like with little or no modification of the bed B, and to mount an accessory to the chassis C of the truck T. The mounting apparatus 11 may be used to mount any one of various specific accessories that are commonly mounted to pickup trucks and the like for enhancing the utility, etc., of the trucks as will now be apparent to those skilled in the art. Such accessories may include bed level tie down points for bed level lashing, either fixed or adjustable to meet load requirements; tie down points at the front or along the sides of the bed for vertical lashing, either fixed or adjustable to meet load requirements; tier racks to support and separate fragile loads, either fixed or adjustable; drop on static ramps for loading lawn mowers, 4 wheelers, etc., by driving on, or using an in-bed winch to pull items into the truck bed; powered ramps; slider ramps to allow boats and the like to be launched from and loaded into the truck bed; winch mounts for large winch jobs from the rear of the truck, complete with cable guides for correct cable pull and truck protection; tailgate lifts to access loads form the ground into the truck; motorized and hand crank crane lifts to lift loads by a cable and then swing or roll the load into the truck bed; gooseneck hitches; fifth wheel hitches; combination hitches providing foundations for both fifth wheel and gooseneck hitches; air foil mounts; load positioners for variety of loads, e.g., tool boxes, liquid tanks, dog boxes, palletized loads; bed protection liners; bed protection dump liners; utility rack mounting for ladder racks, glass racks, campers, etc., rolling bed mounts; etc. The mounting apparatus 11 is shown in FIG. 1 as mounting a typical gooseneck-type trailer hitch H to the chassis C of the truck T and will be described hereinafter relative to such a trailer hitch H but is not to be considered as being limited to such a trailer hitch H or any other specific accessory.

The mounting apparatus 11 includes a frame assembly 13 having a support member 15 for receiving the trailer hitch H, and includes bed pad means 17 for attachment to the chassis C of the truck T and for selectively attaching the frame assembly 13 to the chassis C of the truck T with a portion of the bed pad means 17 positioned within the bed B of the truck T in a position in which the bed pad means 17 will not encumber the bed B of the truck T when the frame assembly 13 is not attached to the chassis C of the truck T.

The frame assembly 13 preferably includes a first longitudinal main rail 19, and a second longitudinal main rail 21. Further, the frame assembly 13 may include a first transverse main rail 23, a second transverse main rail 25, and a third transverse main rail 27. Each main rail 19, 21, 23, 25, 27 is preferably formed out of an elongated structural member having a generally hollow I-beam shaped transverse cross sectional area, with a first groove 29 formed in one side and an opposing second groove 31 formed in the other side as clearly shown in FIGS. 2, 3 and 17. The grooves 29, 31 are located between, and preferably defined by a first or upper flange portion 33 and a second or lower flange portion 35 joined together by spaced web portions 37 as clearly shown in FIG. 17. The web portions 37 are preferably curved so that the grooves 29, 31 have a rounded bight-like portion as clearly shown in FIG. 17, and the side edges of the flange portions 33, 35 form fingers or finger-like portions. The main rails 19, 21, 23, 25, 27 may be constructed out of any substantially rigid, strong material such as metal, in various specific sizes and shapes, and in any manner now apparent to those skilled in the art such as, for example, by being extruded out of 6005A-T5 aluminum or the like in the generally hollow I-beam shape shown in the drawings, etc.

The frame assembly 13 also preferably includes a first clamp bar 39 fixedly attached to one end of the first transverse main rail 23 for extending into the first groove 29 of the first longitudinal main rail 19, a second clamp bar 41 fixedly attached to the other end of the first transverse main rail 23 for extending into the second groove 31 of the second longitudinal main rail 21, a third clamp bar 43 fixedly attached to one end of the second transverse main rail 25 for extending into the first groove 29 of the first longitudinal main rail 19, a fourth clamp bar 45 fixedly attached to the other end of the second transverse main rail 25 for extending into the second groove 31 of the second longitudinal main rail 21, a fifth clamp bar 47 for extending into the second groove 31 of the first longitudinal main rail 19 opposite the first clamp bar 39, a sixth clamp bar 49 for extending into the first groove 29 of the second longitudinal main rail 21 opposite the second clamp bar 41, a seventh clamp bar 51 for extending into the second groove 31 of the first longitudinal main rail 19 opposite the third clamp bar 43, and an eight clamp bar 53 for extending into the first groove 29 of the second longitudinal main rail 21 opposite the fourth clamp bar 45.

The first, second, third and fourth clamp bars 39, 41, 43, 45 are preferably substantially identical to one another. Thus, each clamp bar 39, 41, 43, 45 preferably includes an elongated body member 55 as clearly shown in FIGS. 19 and 20, having a rounded side sized and shaped to substantially conform with the grooves 29, 31 of the corresponding main rail 19, 21 so that the body member 55 can be inserted into one of the grooves 29, 31 as clearly illustrated in FIG. 3. Each body member 55 preferably has a pair of spaced transverse apertures 57 provided therethrough. Each clamp bar 39, 41, 43, 45 may be constructed out of any substantially rigid, strong material such as metal, in various specific sizes and shapes, and in any manner now apparent to those skilled in the art such as, for example, by extruding the body members 55 out of 6005A-T5 aluminum or the like with the transverse apertures 57 drilled or otherwise machined therethrough, etc. Each clamp bar 39, 41, 43, 45 may be fixedly attached to the corresponding main rail 23, 25 in any manner now apparent to those skilled in the art such as by being welded thereto.

The fifth, sixth, seventh and eight clamp bars 47, 49, 51, 53 are preferably substantially identical to one another. Thus, each clamp bar 47, 49, 51, 53 preferably includes an elongated body member 59 as clearly shown in FIGS. 21 and 22, having a rounded side sized and shaped to substantially conform with the grooves 29, 31 of the corresponding main rail 19, 21 so that the body member 59 can be inserted into one of the grooves 29, 31 as clearly illustrated in FIG. 3. Each body member 59 preferably has a pair of spaced, transverse, internally threaded apertures 61 provided therethrough. Each clamp bar 47, 49, 51, 53 may be constructed out of any substantially rigid, strong material such as metal, in various specific sizes and shapes, and in any manner now apparent to those skilled in the art such as, for example, by extruding the body members 59 out of 6005A-T5 aluminum or the like with the transverse apertures 61 drilled or otherwise machined and threaded therethrough, etc.

The frame assembly 13 also preferably includes a plurality of bolt members 63 for coacting with the clamp bars 39–53 to fixedly secure the longitudinal main rails 19, 21 to the transverse main rails 23, 25. Each bolt member 63 includes an elongated shaft 65 for extending through an aperture 57 in one of the clamp bars 39, 41, 43, 45 and through a corresponding aperture 67 in the web portions 37 of a corresponding main rail 19, 21. Each bolt member 63 has an externally threaded portion 69 on one end of the shaft 65 for screwing into one of the threaded apertures 61 in a corresponding clamp bar 47, 49, 51, 53, and an enlarged head 71 on the other end of the shaft 65 for abutting the side of the corresponding clamp bar 39, 41, 43, 45 opposite the side for being inserted into a groove 29, 31 of the corresponding main rail 19, 21 whereby the bolt members 63 can be used to securely clamp a corresponding pair of clamp bars 39–53 to a corresponding main rail 19, 21 as clearly illustrated in, for example, FIGS. 3 and 14. With the clamp bars 39, 41, 43, 45 welded or otherwise securely attached to the ends of the main rails 23, 25, using the bolt members 63 to securely clamp a corresponding pair of clamp bars 39–53 to a corresponding main rail 19, 21 will produce a strong, rigid, generally H-shaped skeleton or framework as will now be apparent to those skilled in the art.

Figure 14:
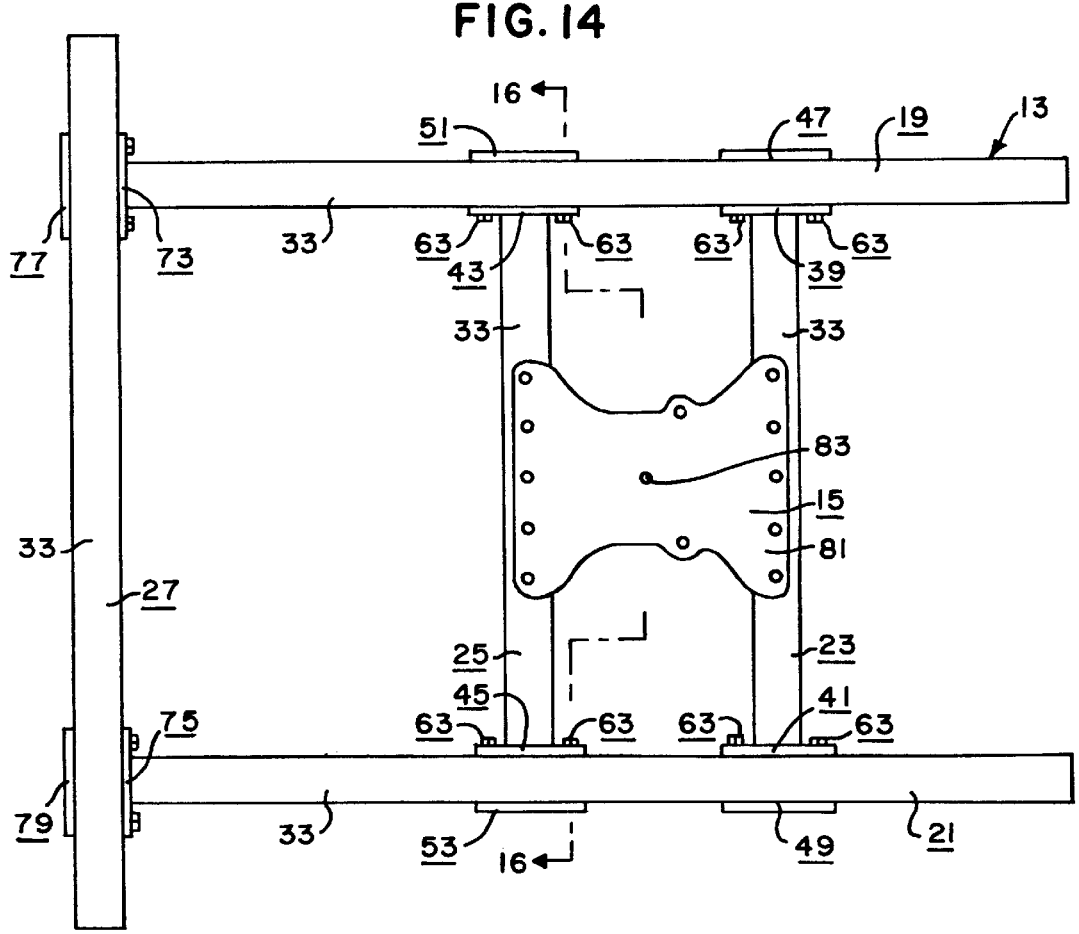
FIG. 14 is a top plan view of a frame assembly of the mounting apparatus of FIG. 1.
Figure 15:
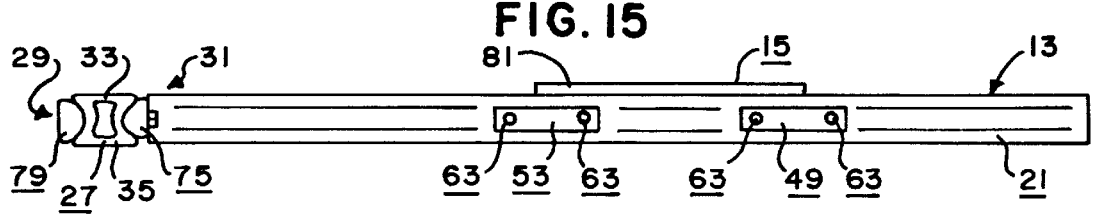
FIG. 15 is a side elevational view of the frame assembly of FIG. 14.
Figure 16:
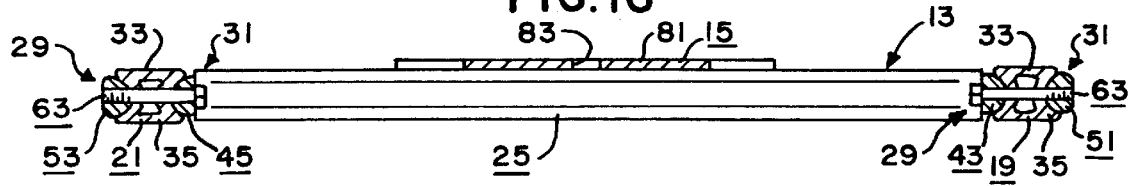
FIG. 16 is a sectional view substantially as taken on line 16—16 of FIG. 14, with portions omitted for clarity.

The third transverse main rail 27 can, if desired, be attached across one end of the first and second longitudinal main rails 19, 21 as clearly shown in FIG. 14 to strengthen the frame assembly 13 and provide more area to attach the frame assembly 13 to the bed B of a truck T, etc. In such an event, the frame assembly 13 preferably includes a ninth clamp bar 73 fixedly attached to one end of the first longitudinal main rail 19 for extending into the first groove 29 of the third transverse main rail 27, a tenth clamp bar 75 fixedly attached to the one end of the second longitudinal main rail 21 for extending into the first groove 29 of the third transverse main rail 27, an eleventh clamp bar 77 for extending into the second groove 31 of the third transverse main rail 27 opposite the ninth clamp bar 73, and a twelfth clamp bar 79 for extending into the second groove 31 of the third transverse main rail 27 opposite the tenth clamp bar 75 (see, in general, FIG. 14). The ninth and tenth clamp bars 73, 75 are preferably substantially identical to the clamp bars 39, 41, 43, 45 and may be welded or otherwise fixedly attached to the corresponding main rails 19, 21. The eleventh and twelfth clamp bars 77, 79 are preferably substantially identical to the clamp bars 47, 49, 51, 53 and bolt members 63 are preferably provided to securely clamp the ninth and eleventh clamp bars 73, 77 to the main rail 27 and to securely clamp the tenth and twelfth clamp bars 75, 79 to the main rail 27 whereby, with the ninth and tenth clamp bars 73, 75 welded or otherwise securely attached to the respective main rails 19, 21, a strong, rigid skeleton or framework as will now be apparent to those skilled in the art.

The support member 15 of the frame assembly 13 may consist simply of a substantially flat metal plate 81 adapted to be fixedly attached to the first and second transverse main rails 23, 25 substantially as shown in FIG. 14 by being welded or bolted thereto, etc., and having one or more apertures 83 therethrough for allowing a trailer hitch H (e.g., a ball type hitch or a fifth-wheel type hitch) to be easily attached thereto.

The bed pad means 17 preferably includes a plurality of bed pads 85 for attachment to the chassis C of the truck T, and a plurality of clamp rail means 87 for clamping the frame assembly 13 and bed pads 85 together.

Each bed pad 85 preferably includes a body member 89 having a generally tee-shaped transverse cross sectional area, with a base or stem portion 91 and a flange portion 93 located on top of and extending on opposite sides of the stem portion 91 (see, in general, FIGS. 2 and 7–9). The side edges of the flange portion 93 form fingers or finger-like portions. The bed pads 85 may be constructed out of any substantially rigid, strong material such as metal, in various specific sizes and shapes, and in any manner now apparent to those skilled in the art such as, for example, by being forged or machined out of 6005A-T5 aluminum or the like in the generally tee-shape shown in the drawings, etc.

The bed pad means 17 also preferably includes a plurality of bolt members 95 for coacting with the chassis C of the truck T to fixedly secure each bed pad 85 to the chassis C. Each bolt member 95 includes an elongated shaft 97 for extending through an aperture 99 in one of the body members 89, through a corresponding aperture A in the bed B of the truck T, to the chassis C. The aperture 99 is preferably elongated to allow adjustment of the bed pad 85 and preferably has an enlarged upper portion to receive the head of the bolt member 95. While the specific attachment of the bed pads 85 to the chassis C may vary depending on the specific truck T, etc., in the version shown in FIG. 2, the bolt member 95 replaces one of the bolt members normally used to secure the bed B to the chassis C, and may extend through an aperture in the bed B, through a bed spacer or mount M, and through an opening O or the like drilled or otherwise formed in the chassis C so a nut member 103 can be used to secure the bolt member 95 to the chassis C, thereby securing both the bed pad 85 and the bed B of the truck T to the chassis C. If the desired location of the bed pads 85 do not so align with the chassis C, constructs or the like can be provided for extending between the bolt members 95 and the chassis C (see, for example, the embodiment of the present invention shown in FIG. 27).

Each clamp rail means 87 preferably includes a slightly elongated body member 105 having a first finger or finger-like portion 107 and a second finger or finger-like portion 109 separated by a generally U or vee-shaped groove 111 (see, in general, FIGS. 2 and 10–13). Each clamp rail means 87 preferably has a first transverse aperture 113 and a spaced second transverse aperture 115 provided therethrough, with the second transverse aperture 115, but not the first transverse aperture 113, being internally threaded. Each clamp rail means 87 may be constructed out of any substantially rigid, strong material such as metal, in various specific sizes and shapes, and in any manner now apparent to those skilled in the art such as, for example, by being forged or machined out of 6005A-T5 aluminum or the like in the generally U or vee-shape shown in the drawings, etc.

The bed pad means 17 also preferably includes a plurality of bolt members 117 for coacting with the clamp rail means 87 to fixedly secure the bed pads 85 to the corresponding main rail 19–27. Each bolt member 117 includes an elongated shaft 119 for extending through a first transverse aperture 113 in the body member 105 of one of the clamp rail means 87, across one of the main rails 19–27, and into the internally threaded second transverse aperture 115 in the body member 105 of an opposing clamp rail means 87. Each bolt member 117 has an externally threaded portion 121 on one end of the shaft 119 for screwing into the internally threaded second transverse aperture 115 in the body member 105 of a clamp rail means 87, and an enlarged head 123 on the other end of the shaft 119 for abutting the side of the body member 105 of a clamp rail means 87 adjacent the mouth of the first transverse aperture 113 whereby the bolt members 117 can be used to securely clamp a corresponding pair of clamp rail means 87 together with a bed pad 85 and a main rail 19–27 wedged fixedly therebetween as clearly shown in FIG. 2. The corresponding main rail 19–27 preferably has a transverse groove 125 therein for receiving at least a portion of the shaft 119 of a bolt member 117 as clearly shown in FIGS. 2 and 4. The groove 125 may be drilled or otherwise formed in the corresponding main rail 19–27 at the time the frame assembly 13 is being attached to the bed pad means 17 in the desired location on either side of a bed pad 85 to prevent lateral movement of the frame assembly 13 relative to that bed pad 85 as will now be apparent to those skilled in the art.

Figure 2:
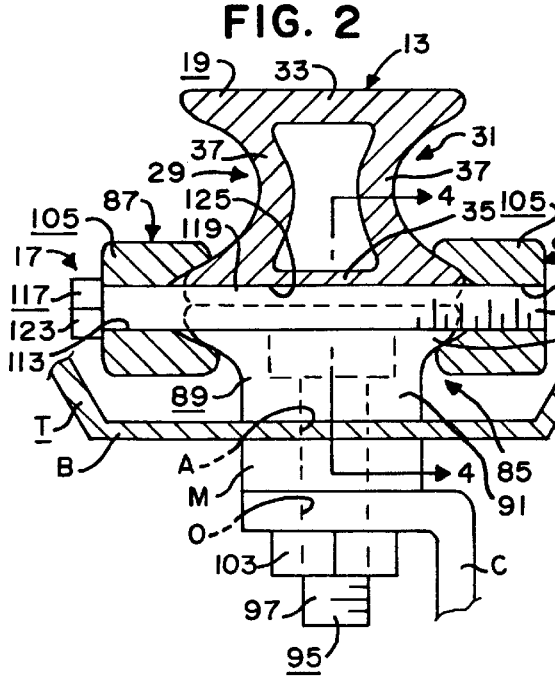
FIG. 2 is a sectional view substantially as taken on line 2—2 of FIG. 1, on a somewhat enlarged scale and with portions omitted for clarity.
Figure 3:
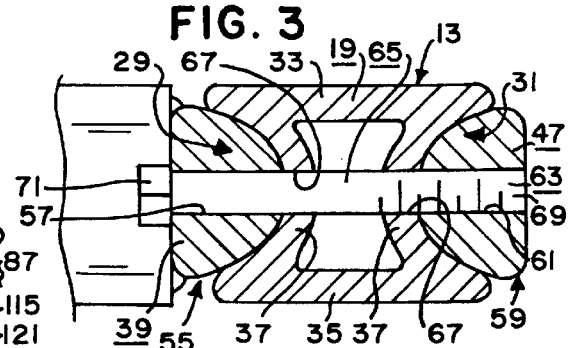
FIG. 3 is a sectional view substantially as taken on line 3—3 of FIG. 1 on a somewhat enlarged scale and with portions omitted for clarity.
Figure 4:
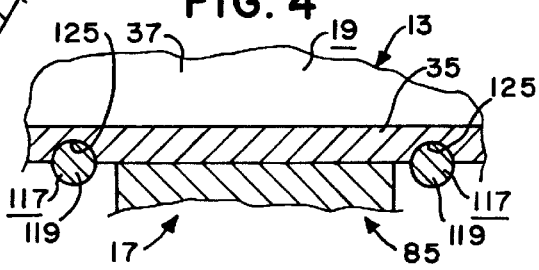
FIG. 4 is a sectional view substantially as taken on line 4—4 of FIG. 2, with portions omitted for clarity.

The use and operation of the mounting apparatus 11 is quite simple. The desired shape and size frame assembly 13 is formed out of the various main rails 19, 21, 23, 25, 27, etc., and the desired trailer hitch H is attached thereto as will now be apparent to those skilled in the art. The bed pads 85 are attached to the chassis C in a layout based at least in part on the shape and size of the frame assembly 13. Preferably, the bed pads 85 are attached to the chassis C at the same locations the bed B of the truck T is attached to the chassis C by merely replacing the bolts that attach the bed B to the chassis C with the bolt members 95 so that the bolt members 95 can be used to attach both the bed pads 85 and the bed B to the chassis C as shown in FIGS. 2 and 6. The frame assembly 13 can them be easily attached to the bed pads 85 using the clamp rail means 87 as illustrated in FIGS. 1 and 2. When the trailer hitch H is not needed, the frame assembly 13 can easily be removed from the truck T by merely loosening the clamp rail means 87, etc., as will now be apparent to those skilled in the art. Because the bed pads 85 have a low profile, etc., they will not encumber the bed B when the frame assembly 13 is removed.

FIGS. 25–30 show modified designs of main rails and clamp bars for the mounting apparatus 11.

First and second longitudinal main rails 131, 133 are shown in FIGS. 25, 26, 29 and 30 that are similar in basic construction and use to the first and second longitudinal main rails 19, 21, i.e., each being preferably formed out of an elongated structural member having a generally hollow I-beam shaped transverse cross sectional area, with a first groove formed in one side and an opposing second groove formed in the other side with the grooves located between, and preferably defined by a first or upper flange portion and a second or lower flange portion joined together by spaced web portions that are preferably curved so that the grooves have a rounded bight-like portion with the side edges of the flange portions forming fingers or finger-like portions. The main rails 131, 133 may be constructed out of any substantially rigid, strong material such as metal, in various specific sizes and shapes, and in any manner now apparent to those skilled in the art such as, for example, by being extruded out of 6005A-T5 aluminum or the like in the generally hollow I-beam shape shown in the drawings, etc.

Each main rail 131, 133 has a uniquely shaped cavity 135 extending the entire length thereof for reasons which will hereinafter become apparent.

First and second clamp bars 137, 139 are shown in FIGS. 27–30 that are similar in basic construction and use to the first and second clamp bars 39, 41, i.e., each being sized and shaped to substantially conform to portions of a corresponding main rail 131, 133, and may be constructed out of any substantially rigid, strong material such as metal, in various specific sizes and shapes, and in any manner now apparent to those skilled in the art such as, for example, by being extruded out of 6005A-T5 aluminum or the like.

Each clamp bar 137, 139 has a unique cross sectional shape that matches the upper and/or lower portions of the cross sectional shape of the cavity 135 in the corresponding main rail 131, 133 so that the clamp bars 39, 41 can be easily slide into the cavity 135 in the corresponding main rail 131, 133 as clearly shown in FIGS. 29 and 30.

Such a unique design allows various components to be securely attached to the main rails 131, 133, etc., by merely using one or more bolts 141 to extend through the component, through the top or bottom of the respective main rail 131, 133 and into the respective clamp bar 137, 139. For example, FIGS. 29 and 30 clearly show a hitch plate 143 fixedly attached to the main rails 131, 133 by means of the clamp bars 137, 139 and bolts 141. The hitch plate 143 is preferably similar in construction and use to the hitch plate 81, having an aperture 83 therethrough for allowing a trailer hitch or the like to be easily attached thereto, etc. The hitch plate 143 may consist merely of a rigid metal plate sized to extend completely from the main rail 131 to the main rail 133 as clearly shown in FIG. 29. To mount the hitch plate 143 to the main rails 131, 133, the respective clamp bar 137, 139 is merely slide into the cavity 135 in the respective main rail 131, 135 to a location directly under the portion of the hitch plate 143 to be fixed to the main rail 131, 133. Holes can then be drilled through the hitch plate 143, main rails 131, 133, and clamp bars 137, 139 to allow bolts 141 to pass therethrough to fixedly attach the hitch plate 143 to the main rails 131, 133 and provide a more rigid construct, etc., as will now be apparent to those skilled in the art. The holes drilled through the clamp bars 137, 139 may be threaded to allow the bolts to be screwed thereto. The unique shape of the cavities 135 in the main rails 131, 133 and the cross sectional area of the clamp bars 137, 139 will allow the clamp bars 137, 139 to be slide into the cavities 135 oriented either in the up or down direction to allow accessories or the like to be easily attached to the main rails 131, 133 from either the top or bottom thereof. Clamp bars 73, 75 may be fixedly attached to one end of the respective first and second main rails 131, 133 for allowing the main rails 131, 133 to be easily attached to a transverse main rail, etc., as hereinabove disclosed relative to the first and second longitudinal main rails 19, 21.

A second preferred embodiment of the mounting apparatus of the present invention is shown in FIGS. 31–40, and identified by the numeral 2.11. The mounting apparatus 2.11 is also especially adapted and designed to be installed in the bed B of a pickup truck T (see FIGS. 31–33 and 37–40) or the like with little or no modification of the bed B, and to mount an accessory such as a trailer hitch H to the chassis C of the truck T.

The mounting apparatus 2.11 includes a frame assembly 2.13 having a support member 2.15 for receiving the trailer hitch H, and includes bed pad means 2.17 for attachment to the chassis C of the truck T and for selectively attaching the frame assembly 2.13 to the chassis C of the truck T with a portion of the bed pad means 2.17 positioned within the bed B of the truck T in a position in which the bed pad means 2.17 will not encumber the bed B of the truck T when the frame assembly 2.13 is not attached to the chassis C of the truck T.

The frame assembly 2.13 preferably includes a first longitudinal main rail 2.19, a second longitudinal main rail 2.21, a first transverse main rail 2.23, and a second transverse main rail 2.25. Each main rail 2.19, 2.21, 2.23, 2.25 is preferably formed out of an elongated structural member having a generally angle shaped transverse cross sectional area, with a normally horizontal first flange 2.29 and a normally vertical second flange 2.31. The main rails 2.19, 2.21, 2.23, 2.25 may be constructed out of any substantially rigid, strong material such as metal, in various specific sizes and shapes, and in any manner now apparent to those skilled in the art such as, for example, by being extruded out of 6005A-T5 aluminum or the like in the generally angle shape shown in the drawings, etc.

The opposite ends of the first and second longitudinal main rails 2.19, 2.21 are preferably welded or otherwise securely attached to the first and second transverse main rails 2.23, 2.25 at spaced locations to form a strong, rigid skeleton or framework as clearly shown in FIGS. 31 and 34–36.

The support member 2.15 of the frame assembly 2.13 may consist simply of a substantially flat metal plate 2.81 adapted to be fixedly attached to the first and second transverse main rails 2.23, 2.25 substantially as shown in FIGS. 31 and 34–36 by being welded or bolted thereto, etc., and having one or more apertures 2.83 therethrough for allowing a trailer hitch H (e.g., a ball type hitch or a fifth-wheel type hitch) to be easily attached thereto.

The bed pad means 2.17 preferably includes a plurality of bed pads 2.85 for attachment to the frame assembly 2.13, and a plurality of bolt means or members 2.87 for clamping the frame assembly 13 and bed pads 85 to the chassis C of the truck T.

Each bed pad 2.85 preferably consists of a rigid body member 2.89 fixedly attached to the first flange 2.29 of the first and second transverse main rails 2.23, 2.25 by being welded or bolted thereto, etc.

Figure 31:
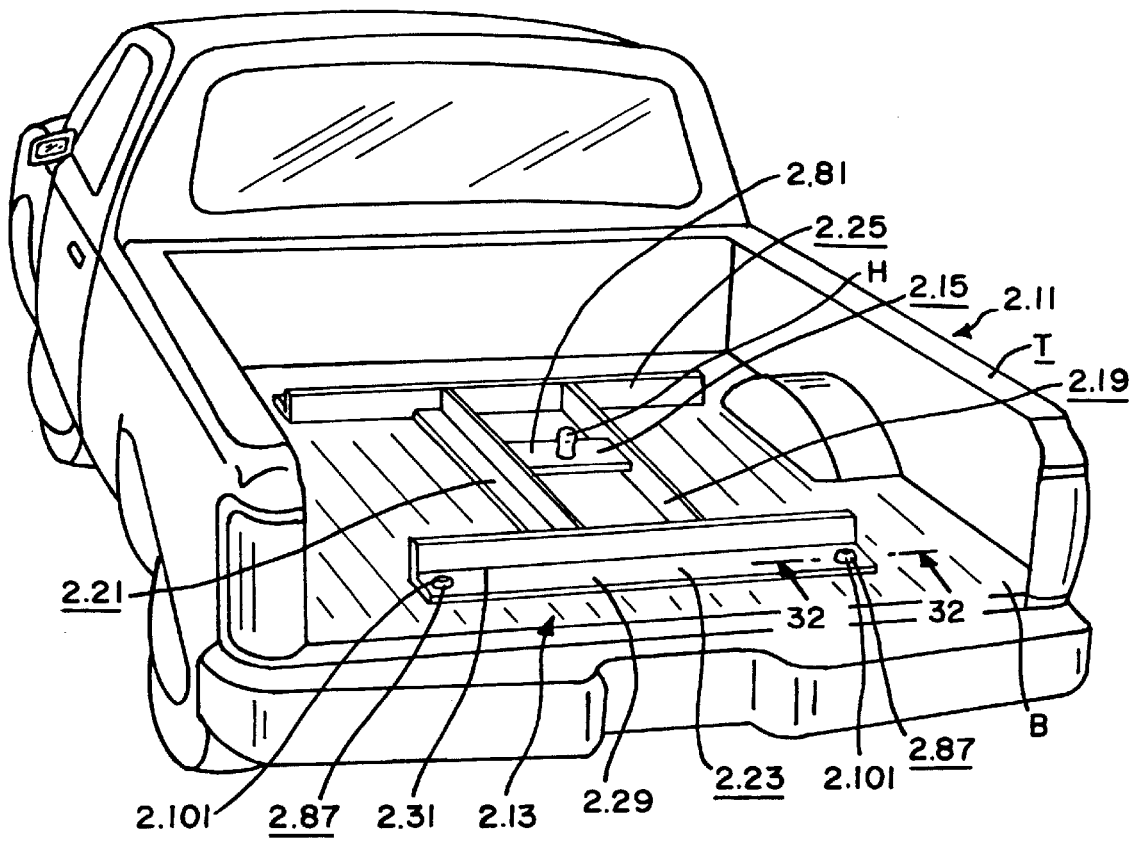
Figure 32:
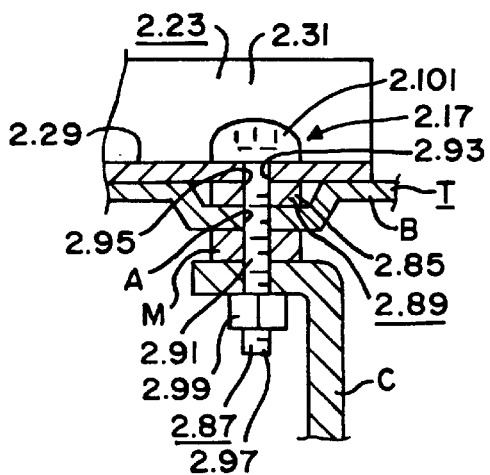
FIG. 32 is a sectional view substantially as taken on line 32—32 of FIG. 31, on a somewhat enlarged scale and with portions omitted for clarity.
Figure 33:
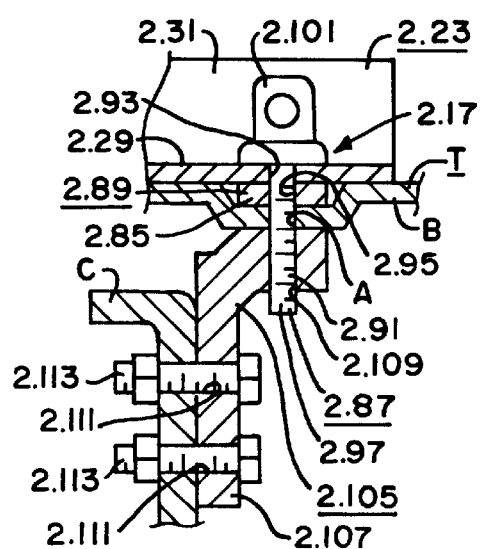
FIG. 33 is a sectional view similar to FIG. 32, but showing a modified construction.
Figure 34:
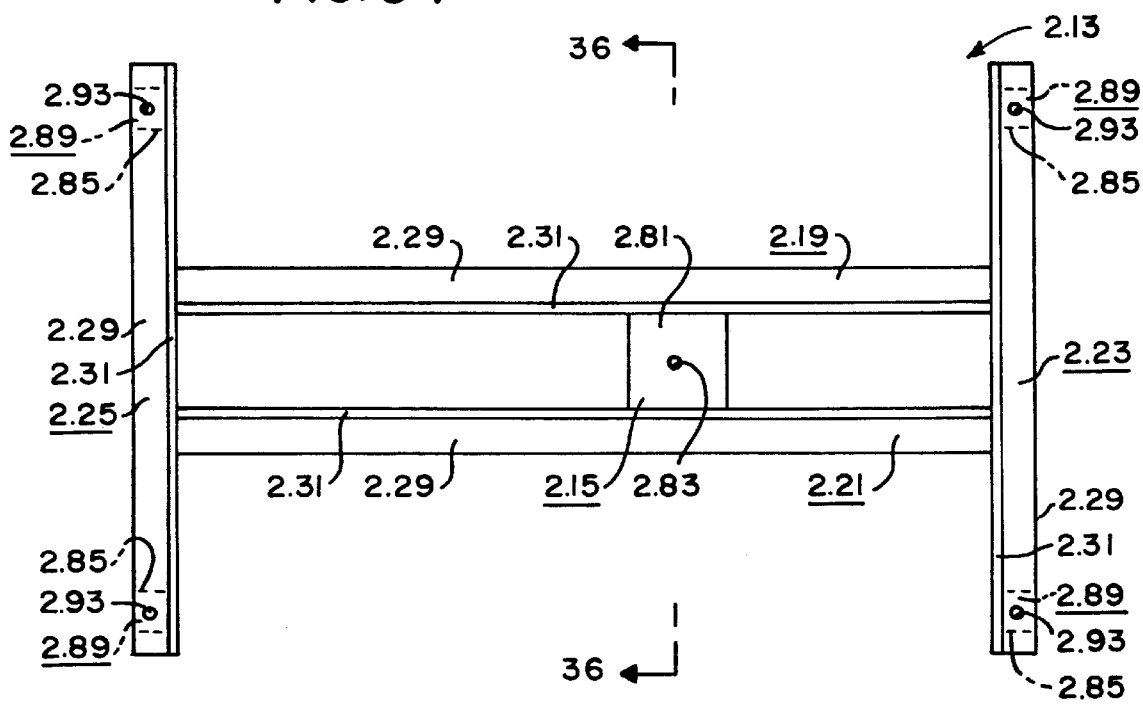
FIG. 34 is a top plan view of a frame assembly of the mounting apparatus of FIG. 31.
Figure 35:
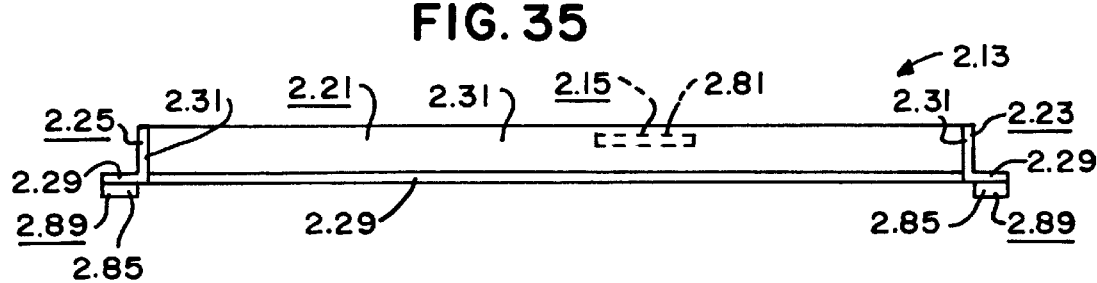
FIG. 35 is a side elevational view of the frame assembly of FIG. 34.
Figure 36:
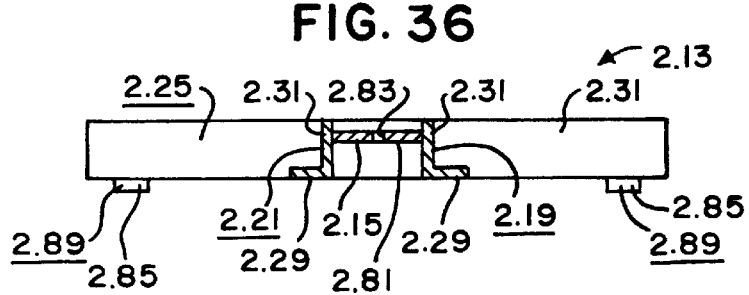
FIG. 36 is a sectional view substantially as taken on line 36—36 of FIG. 34.
Figure 37:
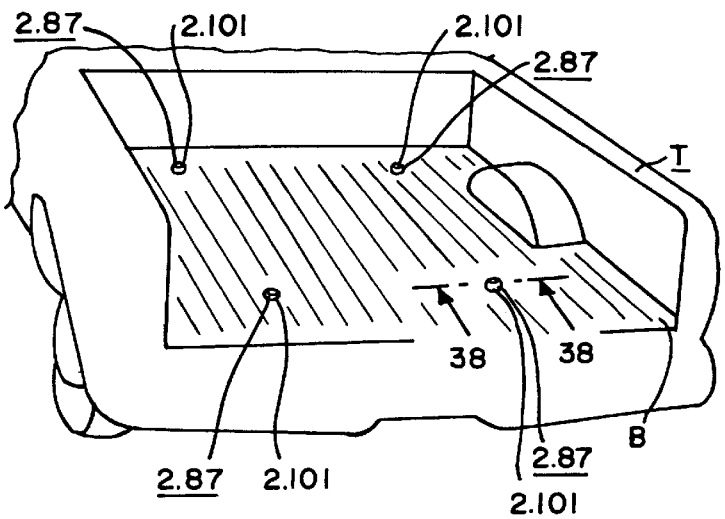
FIG. 37 is a perspective view similar to FIG. 31, but with a portion of the mounting apparatus thereof removed, leaving the bed of the pickup truck unencumbered.
Figure 38:
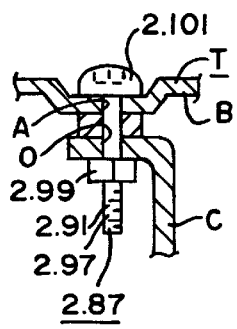
FIG. 38 is a sectional view substantially as taken one line 38—38 of FIG. 37, on a somewhat enlarged scale and with portions omitted for clarity.
Figure 39:
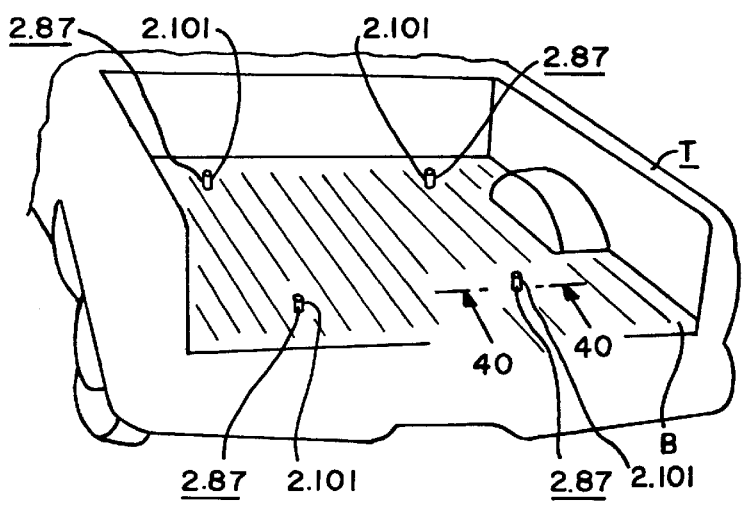
FIG. 39 is a perspective view similar to FIG. 37, but showing a modified construction.
Figure 40:
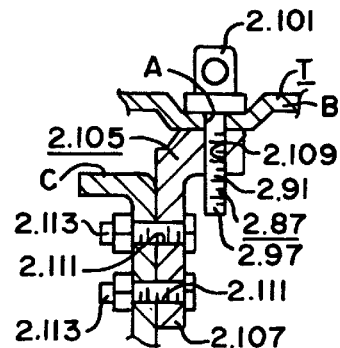
FIG. 40 is a sectional view substantially as taken one line 40—40 of FIG. 39, on a somewhat enlarged scale and with portions omitted for clarity.

Each bolt member 2.87 preferably includes an elongated shaft 2.91 for extending through an aperture 2.93 in the first flange 2.29 of one of the first and second transverse main rails 2.23, 2.25, through a corresponding aperture 2.95 in the body member 2.89 of a corresponding bed pad 2.85, through a corresponding aperture A in the bed B of the truck T, to the chassis C as clearly shown in FIG. 32. Each bolt member 2.87 has an externally threaded portion 2.97 on one end of the shaft 2.91 for screwably receiving a nut member 2.99, and an enlarged head 2.101 on the other end of the shaft 2.91 for abutting the first flange 2.29 of one of the first and second transverse main rails 2.23, 2.25 adjacent the mouth of the aperture 2.93 whereby the bolt members 2.87 can be used to securely clamp the frame assembly 2.13 to the bed B of the truck T, etc. The enlarged head 2.101 of each bolt member 2.87 may be rounded as shown in FIGS. 31, 32, 37, 38 so as not to encumber the bed B of the truck T when the frame assembly 2.13 is not attached to the chassis C of the truck T as clearly illustrated in FIGS. 37 and 38. Optionally, the enlarged head 2.101 of each bolt member 2.87 may be in the form of an eye bolt as shown in FIGS. 33, 39, 40 so as to enhance, and not encumber, the bed B of the truck T when the frame assembly 2.13 is not attached to the chassis C of the truck T as clearly illustrated in FIGS. 39 and 40, by providing a point of attachment even when the frame assembly 2.13 is not attached to the chassis C of the truck T to allow a load to be easily tied to the bed B, etc.

While the specific attachment of the bolt members 2.87 to the chassis C may vary depending on the specific truck T, etc., in the version shown in FIG. 32, the bolt member 2.87 replaces one of the bolt members normally used to secure the bed B to the chassis C, and may extend through an aperture A in the bed B, through a bed spacer or mount M, and through an opening 0 or the like in the chassis C so a nut member 2.99 can be used to secure each bolt member 2.87 to the chassis C. If the desired location of the bed pads 2.85 do not so align with the chassis C, a construct 2.105 or the like can be provided for extending between each bolt member 2.87 and the chassis C (see, for example, FIGS. 33). The construct 2.105 may consist of a elongated body member 2.107 having a threaded aperture 2.109 adjacent one end for coacting with the threaded portion 2.97 of a bolt member 2.87 and having one or more apertures 2.111 adjacent the other end for coacting with bolt means 2.113 to be bolted to the chassis C. It should be noted that rather than being threaded, the aperture 2.109 could be unthreaded and a nut member 2.99 could be used to secure the bolt member 2.87 thereto.

The use and operation of the mounting apparatus 2.11 is quite simple. The desired shape and size frame assembly 2.13 is formed out of the various main rails 2.19, 2.21, 2.23, 2.25, etc., and the desired trailer hitch H is attached thereto as will now be apparent to those skilled in the art. The bed pads 2.85 are attached to frame assembly 2.13 in a layout based at least in part on the shape and size of the frame assembly 2.13 and the bed B of the truck T. Preferably, the bed pads 2.85 are attached to the frame assembly 2.13 in positions corresponding to the locations the bed B of the truck T is attached to the chassis C so that, by merely replacing the bolts that attach the bed B to the chassis C with the bolt members 2.87, the bolt members 2.87 can be used to attach both the frame assembly 2.13 and the bed B to the chassis C as shown in FIGS. 31 and 32. Otherwise, the constructs 2.105 can be used to secure the bolt members 2.87, and thus the frame assembly 2.13, to the chassis C. When the trailer hitch H is not needed, the frame assembly 2.13 can easily be removed from the truck T by merely removing the bolt members 2.87 as will now be apparent to those skilled in the art. The bolt members 2.87 can then be replaced and, because the head 2.101 of each bolt member 2.87 has a low profile, etc., they will not encumber the bed B when the frame assembly 2.13 is removed.

Although the present invention has been described and illustrated with respect to preferred embodiments and preferred uses therefor, it is not to be so limited since modifications and changes can be made therein which are within the full intended scope of the invention.

What is claimed is:

1. A mounting apparatus for mounting an accessory to a pickup truck having a chassis, and having a bed attached to the chassis; said mounting apparatus comprising:
   (a) a frame assembly for receiving the accessory; said frame assembly including a first longitudinal main rail, a second longitudinal main rail, and a transverse component; each said longitudinal main rail having a grooved portion;
   (b) bed pad means for attachment to the chassis of the truck and for selectively attaching said frame assembly to the chassis of the truck with a portion of said bed pad means positioned within the bed of the truck in a position in which said bed pad means will not encumber the bed of the truck when said frame assembly is not attached to the chassis of the truck;
   (c) a first clamp bar;
   (d) a first bolt coacting with said first clamp bar for fixedly attaching said first longitudinal mail rail and said transverse component together;
   (e) and a second clamp bar; and
   (f) a second bolt coacting with said second clamp bar for fixedly attaching said second longitudinal mail rail and said transverse component together; each said clamp bar includes a body member having a shape to substantially conform with said groove of each said longitudinal main rail for co-acting with said clamp bar to fixedly secure each said longitudinal main rail to said transverse component.

2. The mounting apparatus of claim 1 in which said bed pad means includes bolt means for extending through said frame assembly and for being attached to the chassis of the truck.

3. The mounting apparatus of claim 2 in which said bolt means of bed pad means have rounded head means that do not encumber the bed of the truck when the frame assembly is not attached to the chassis of the truck.

4. The mounting apparatus of claim 2 in which said bolt means of bed pad means have eye-bolt head means for providing a point of attachment even when the frame assembly is not attached to the chassis of the truck.

5. A mounting apparatus for mounting an accessory to a pickup truck having a chassis, and having a bed attached to the chassis; said mounting apparatus comprising:

(a) a frame assembly for receiving the accessory;
   (b) bed pad means for attachment to the chassis of the truck and for selectively attaching said frame assembly to the chassis of the truck with a portion of said bed pad means positioned within the bed of the truck in a position in which said bed pad means will not encumber the bed of the truck when said frame assembly is not attached to the chassis of the truck;
   said frame assembly including a first longitudinal main rail, a second longitudinal main rail, a first transverse main rail and a second transverse main rail;
   each of said longitudinal main rails having a first groove and a second groove; and
   said frame assembly including a first clamp bar fixedly attached to one end of said first transverse main rail for extending into said first groove of said first longitudinal main rail, a second clamp bar fixedly attached to the other end of said first transverse main rail for extending into said second groove of said second longitudinal main rail, a third clamp bar fixedly attached to one end of said second transverse main rail for extending into said first groove of said first longitudinal main rail, a fourth clamp bar fixedly attached to the other end of said second transverse main rail for extending into said second groove of said second longitudinal main rail, a fifth clamp bar for extending into said second groove of said first longitudinal main rail opposite said first clamp bar, a sixth clamp bar for extending into said first groove of said second longitudinal main rail opposite said second clamp bar, a seventh clamp bar for extending into said second groove of said first longitudinal main rail opposite said third clamp bar, and an eighth clamp bar for extending into said first groove of said second longitudinal main rail opposite said fourth clamp bar; each said clamp bar includes a body member having a shape to substantially conform with at least one of said groove's of each said longitudinal main rail for co-acting with a said clamp bar to fixedly secure each said longitudinal main rail to a said first or said second transverse main rail.

6. The mounting apparatus of claim 5 in which said bed pad means includes a plurality of bed pads for attachment to the chassis of the truck, and a plurality of clamp rail means for clamping said frame assembly and said bed pads together.

7. The mounting apparatus of claim 6 in which each of said bed pads has a first finger and a second finger; in which said frame assembly includes a main rail having a first finger and a second finger; and in which each of said clamp rail means of bed pad means has a groove for wedgeably urging one of said fingers of said bed pad and one of said fingers of said main rail together.

8. The mounting apparatus of claim 7 in which said first and second fingers of said bed pad oppose one another; in which said first and second fingers of said main rail oppose one another; and in which said bed pad means includes bolt means for bolting a pair of said clamp rail means together with said bed pad and said main rail wedged therebetween.

9. The mounting apparatus of claim 8 in which said bolt means includes a bolt member; and in which said main rail has a transverse groove therein for receiving at least a portion of said bolt member.

* * * * *